United States Patent
Mohanty et al.

(10) Patent No.: US 10,712,481 B1
(45) Date of Patent: Jul. 14, 2020

(54) FABRICATING OF DIFFRACTION GRATING BY ION BEAM ETCHING

(71) Applicant: Facebook Technologies, LLC, Menlo Park, CA (US)

(72) Inventors: Nihar Ranjan Mohanty, Redmond, WA (US); Giuseppe Calafiore, Redmond, WA (US); Matthew E. Colburn, Woodinville, WA (US); Austin Lane, Redmond, WA (US); Matthieu Charles Raoul Leibovici, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/054,116

(22) Filed: Aug. 3, 2018

Related U.S. Application Data

(60) Provisional application No. 62/541,470, filed on Aug. 4, 2017.

(51) Int. Cl.
*G02B 5/18* (2006.01)

(52) U.S. Cl.
CPC ......... *G02B 5/1857* (2013.01); *G02B 5/1833* (2013.01)

(58) Field of Classification Search
None
See application file for complete search history.

(56) References Cited

U.S. PATENT DOCUMENTS

| | | | | |
|---|---|---|---|---|
| 5,417,799 A * | 5/1995 | Daley | ................ | C04B 41/5346 216/24 |
| 10,302,826 B1 * | 5/2019 | Meyer Timmerman Thijssen ...... | | G02B 5/1857 |
| 2004/0013076 A1 * | 1/2004 | Funato | ................ | G11B 7/1275 369/112.12 |
| 2005/0130072 A1 * | 6/2005 | Koeda | ................ | G02B 5/1857 430/321 |
| 2014/0092384 A1 * | 4/2014 | Ebata | ........................ | G03F 1/54 356/319 |
| 2014/0353141 A1 * | 12/2014 | Liu | ...................... | G02B 5/1857 204/192.34 |
| 2015/0048047 A1 * | 2/2015 | Liu | ...................... | G03F 7/0005 216/24 |
| 2016/0033784 A1 * | 2/2016 | Levola | ............... | G02B 27/4205 385/37 |
| 2016/0035539 A1 * | 2/2016 | Sainiemi | ............ | H01J 37/3053 204/298.36 |

* cited by examiner

*Primary Examiner* — Allan W. Olsen
(74) *Attorney, Agent, or Firm* — Fenwick & West LLP

(57) ABSTRACT

A method for fabricating a diffraction grating includes generating an ionized gas, passing the ionized gas through a gating structure to selectively directed gas toward a substrate, injecting an etchant gas into the directed gas, and exposing a surface of the substrate to the directed gas and the injected etchant gas to form grating structures on the surface of the substrate.

9 Claims, 4 Drawing Sheets

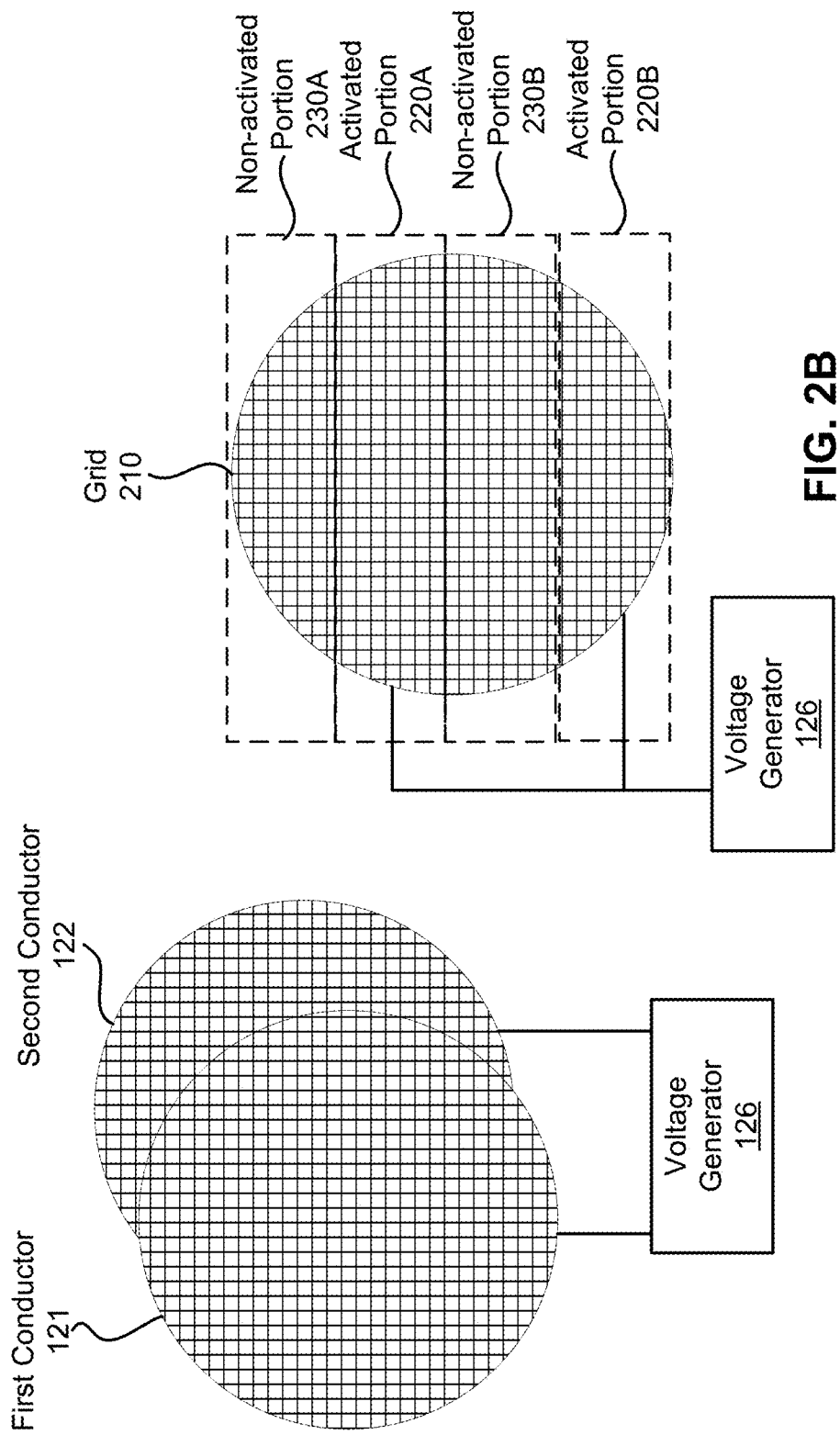

FABRICATING OF DIFFRACTION GRATING BY ION BEAM ETCHING

CROSS REFERENCE TO RELATED APPLICATION

This application claims the benefit of U.S. Provisional Application No. 62/541,470, filed on Aug. 4, 2017, which is incorporated by reference herein in its entirety.

BACKGROUND

This disclosure relates generally to fabricating diffraction gratings, and specifically to fabricating diffraction gratings by ion beam etching.

Diffraction gratings are used in various optical devices to perform certain optical functions such as eliminating artifacts or processing color in images. These diffraction gratings typically have ridges or rulings on surface and may be made of different materials and have certain patterns. It is desirable to customize diffraction gratings for a particular purpose or configuration of related optical devices. Depending on the application, height, lower width, and angles between walls as well as the distance between the grating structures may be customized. Customized diffraction gratings are difficult to generate using conventional fabrication methods. Thus, an improved fabrication method for generating a controllable substrate profile is considered desirable.

SUMMARY

Embodiments relate to fabricating a diffraction grating using ion beam etching. An ionized gas is generated. The ion gas is passed through a gating structure to selectively direct gas toward a substrate. An etchant gas is injected into the directed gas. A surface of the substrate is exposed to the directed gas and the injected etchant gas to form grating structures on the surface of the substrate.

Embodiments also relate to a fabrication device for fabricating the diffraction grating. The fabrication device includes an ionized gas generator, a gating structure, an etchant gas injector, and a surface of a substrate. The ionized gas generator generates an ionized gas. The gating structure passes the ionized gas to selectively direct gas toward a substrate. The etchant gas injector injects an etchant gas into the direct gas. The surface of the substrate is exposed to the directed gas and the injected etchant gas to form grating structures on the surface of the substrate.

BRIEF DESCRIPTION OF THE DRAWINGS

FIG. 2A illustrates a first conductor and a second conductor of a gating structure, in accordance with an embodiment.

FIG. 2B illustrates non-activated portions and activated portions of a grid, in accordance with an embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Overview

In the following description of embodiments, numerous specific details are set forth in order to provide more thorough understanding. However, the embodiments may be practiced without one or more of these specific details. In other instances, well-known features have not been described in detail to avoid unnecessarily complicating the description.

Embodiments are described herein with reference to the figures where like reference numbers indicate identical or functionally similar elements. Also in the figures, the left most digits of each reference number corresponds to the figure in which the reference number is first used.

Embodiments relate to a three-dimensional diffraction gratings of various profiles generated by projecting etchant gas onto a surface of a substrate. Parts of the grid may be selectively applied with voltage so that only some of ionized gas passing through the grid are accelerated for impinging on the surface of the substrate with or without the etchant gas. A plate of a narrower aperture may also be used to selectively pass the ionized gas that impinge on the substrate with or without the etchant gas.

Embodiments may be used for a diffraction grating used in association with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a 3D effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

System Architecture

Figure 1:
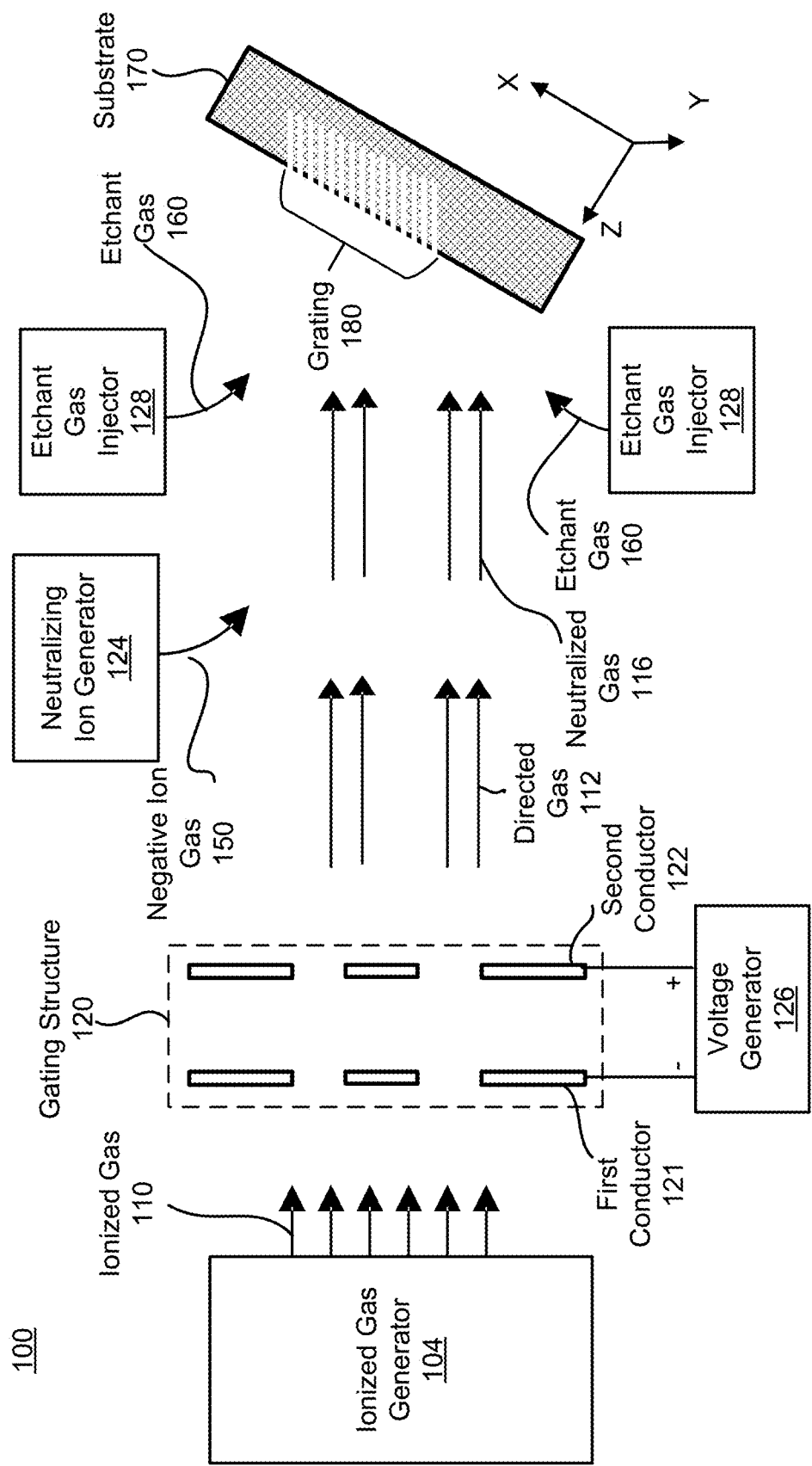
FIG. 1 is a block diagram of a system environment in which a fabrication device operates, in accordance with an embodiment.

FIG. 1 is a block diagram of a system environment in which a fabrication device 100 operates, in accordance with an embodiment. The fabrication device 100 is used for fabricating a diffraction grating 180 on a surface of a substrate 170. The fabrication device 100 may include, among other components, an ionized gas generator 104, a gating structure 120, a voltage generator 126, a neutralizing ion generator 124, and an etchant gas injector 128.

The ionized gas generator 104 generates an ionized gas 110. Ionization is the process by which an atom or a molecule acquires a negative or positive charge by gaining or losing electrons to form ions. In some embodiments, the ionized gas generator 104 is a reactive-ion etching (RIE) system. In some other embodiments, the ionized gas generator 104 is an inductively coupled plasma (ICP) system, a microwave, or an electron cyclotron resonance (ECR) system. The ionized gas generator 104 may include a cylindrical vacuum chamber, with a substrate platter situated in the bottom portion of the chamber and electrically isolated from the rest of the chamber (not shown). In the ICP system, the ionized gas 110 is generated with a radio frequency (RF) powered magnetic field. Ionized gas 110 is initiated in the ICP system by applying a strong RF electromagnetic field to the substrate platter. The field may be set to a frequency of 13.56 MHz and applied at a few hundred watts. The oscillating electric field ionizes the gas molecules by stripping them of electrons, creating the ionized gas 110. The ionized gas 110 acquires a positive charge by losing electrons. In the embodiment of FIG. 1, the ionized gas 110 is ionized Argon gas but other gases such as, fluorocarbons, oxygen, chlorine, boron trichloride, sometimes with the addition of nitrogen, helium, and other gases may also be used as ionized gas 110.

The gating structure 120 passes the ionized gas 110 to selectively direct portions of gas toward the substrate 170. The gating structure 120 may include, among other components, a first conductor 121 and a second conductor 122. In the embodiment of FIG. 1, the first conductor 121 is a first grid and the second conductor 122 is a second grid through which the ionized gas 110 pass sequentially. The ionized gas 110 is accelerated in the gating structure 120 into the directed gas 112.

A voltage generator 126 applies a voltage difference across the first conductor 121 and the second conductor 122 to accelerate the ionized gas 110 into the directed gas 112. Specifically, the voltage generator 126 applies a negative voltage to the first conductor 121 and a positive voltage to the second conductor 122. The first conductor 121 is coupled to a negative terminal of the voltage generator 126, and the second conductor 122 is coupled to a positive terminal of the voltage generator 126. In this example, the ionized gas 110 is negatively charged, and hence, the ionized gas 110 is accelerated as it passes through the gating structure 120. In embodiments where the ionized gas 110 is positively charged, the voltage generator 126 applies a positive voltage to the first conductor 121 and a negative voltage to the second conductor 122. The first conductor 121 is coupled to a positive terminal of the voltage generator 126, and the second conductor 122 is coupled to a negative terminal of the voltage generator 126. In some embodiments, one or more screening structures are held at ground potential.

The neutralizing ion generator 124 neutralizes the directed gas 112 using electrons or neutralizing gas ionized with polarity opposite to the directed gas 112. In the embodiment of FIG. 1, the neutralizing ion generator 124 neutralizes the directed gas 112 using negative ion gas 150, resulting in a neutralized gas 116. The polarity of the negative ion gas 150 is opposite to the directed gas 112 (e.g., positive ionized Argon gas).

The etchant gas injector 128 injects an etchant gas 160 into the directed gas 112. The etchant gas 160 moves along with the directed gas 112 and then reacts with the surface of the substrate 170 to remove or etch portions of the surface of the substrate 170. Such process is also known as dry etching. Dry etching typically etches directionally or anisotropically. The etchant gas 160 may be, e.g., $Cl_2$, $CF_4$, $SF_6$, $NF_3$, $O_2$, $CH_3OH$, $C_2H_5OH$, etc. In some embodiments, the substrate 170 is tilted at a predetermined angle relative to the path of the directed gas 112 to form the grating structures that are tilted relative to the surface of the substrate 170.

The grating 180 formed using methods described herein is an optical component that diffracts incoming light into several beams travelling in different directions. The directions of the beams is based in part on structure and optical properties of materials (e.g., refractive index) of the grating 180. Accordingly, particular directions of the beams can be achieved by selecting appropriate structure and materials of the grating 180. The grating 180 may be, e.g., a three-dimensional diffraction grating, phase grating, Bragg grating, a surface relief grating, or a liquid crystal grating.

In some embodiments, the substrate 170 and the structures are cuboid. However, in some other embodiments, the substrate and the structures can have other shapes. For example, a structure can have a cross-section that is a triangle. Similarly, a cross-section of the substrate can be a triangle.

In some other embodiments, the grating 180 is a volumetric Bragg grating. The volumetric Bragg grating is an optical component that has a periodic variation in refractive index. In some embodiments, the periodic variation in refractive index is at least 0.1. The volumetric Bragg grating produces a high diffraction for incident light at one or more wavelengths that fulfil the Bragg condition. Accordingly, the volumetric Bragg grating has a large diffraction bandwidth. The volumetric Bragg grating can act as a diffractive element for coupling light into or out of a waveguide. In one embodiment, the wavelengths that fulfill the Bragg condition falls in a range from 400 nm to 1500 nm.

The volumetric Bragg grating includes a resist structure on a substrate. In some embodiments, the resist structure includes a polymer material, such as poly(tert-butyl acrylate), poly(tert-butyloxycarbonyl styrene), or other polymers containing protected functional groups, such as phenols and carboxylic acids, which can be deprotected using strong acid, base, or high intensity radiation.

FIG. 2A illustrates a first conductor and a second conductor of the gating structure 120, in accordance with an embodiment. As described above with reference to FIG. 1, the voltage generator 126 applies a voltage difference across the first conductor 121 and the second conductor 122 to accelerate the ionized gas 110 into the directed gas 112. Specifically, the voltage generator 126 applies a negative voltage to the first conductor 121 and a positive voltage to the second conductor 122. The first conductor 121 is coupled to the negative terminal of the voltage generator 126, and the second conductor 122 is coupled to the positive terminal of the voltage generator 126. In some embodiments, the voltage generator 126 applies a positive voltage to the first conductor 121 and a negative voltage to the second conductor 122. The first conductor 121 is coupled to the positive terminal of the voltage generator 126, and the second conductor 122 is coupled to the negative terminal of the voltage generator 126.

FIG. 2B illustrates non-activated portions and activated portions of a grid, in accordance with an embodiment. The non-active portions and the active portions are electrically isolated from each other. The voltage generator 126 applies a voltage difference across active portions of the grid 210. In some embodiments, there are one or more activated portions and one or more non-activated portions of the grid 210. In the embodiment of FIG. 2B, the voltage generator 126 is coupled to and applies voltage to activated portion 220A and activated portion 220B. The voltage generator 126 does not apply voltage to non-activated portion 230A and non-activated portion 230B. In some embodiments, the voltage generator 126 applies a voltage difference across portions of a first grid and portions of a second grid.

Portions of the ionized gas 110 in active portions are accelerated whereas portions of the ionized gas 110 in the non-active portions are not accelerated. Therefore, by selecting and controlling the sections of the grid 210 that are active or non-active, the ionized gas 110 may be accelerated and impinge upon selected portions of the substrate 170 with the etchant gas 160. In this way, patterns of grating 180 as desired may be formed on the substrate. In this embodiment, there may be one or more screening grids at neutral potential.

Figure 3A:
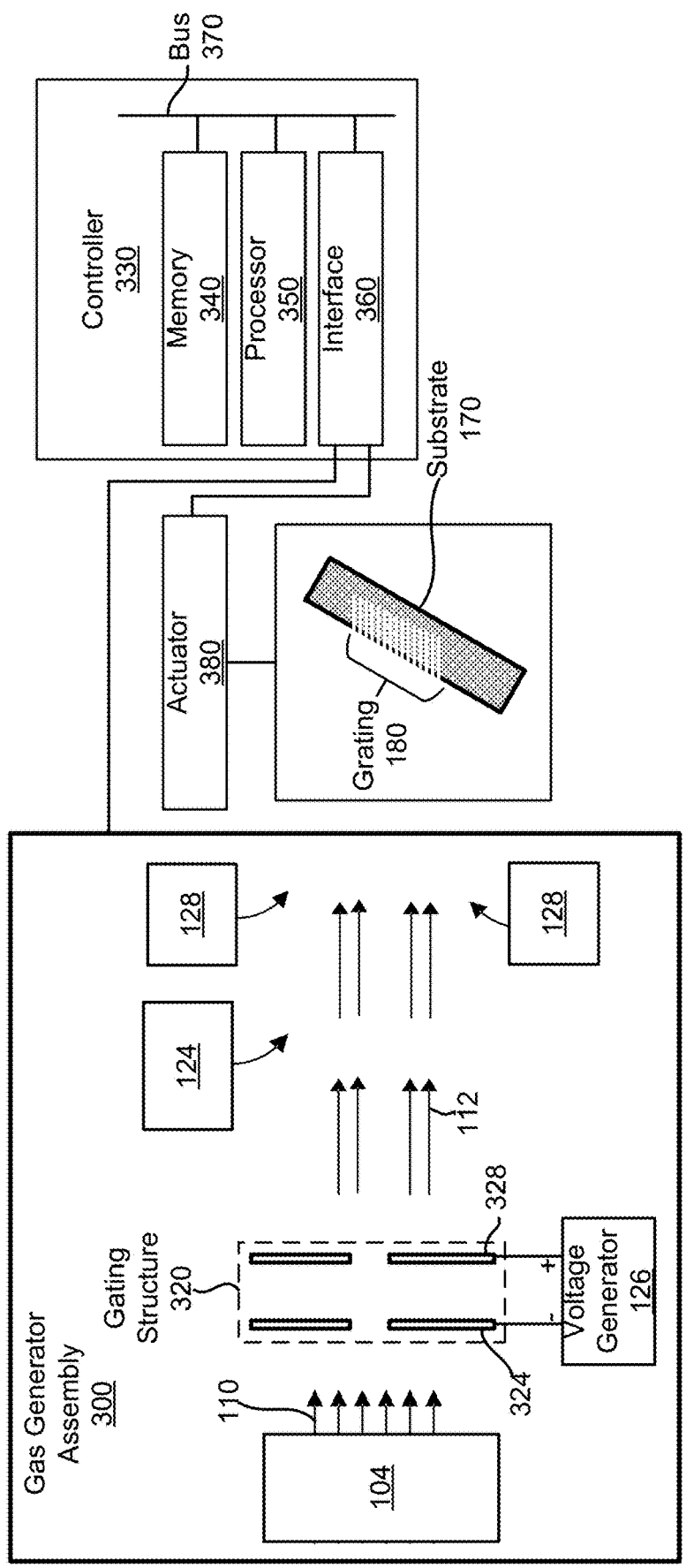
FIG. 3A is a diagram of a gas generator assembly, a substrate, a controller, and an actuator, in accordance with an embodiment.

FIG. 3A is a diagram illustrating overall components associated with the fabrication device 100, according to one embodiment. These components may include, among others, of a gas generator assembly 300, a controller 330 and an actuator 380, in accordance with an embodiment.

The gas generator assembly 300 generates the directed gas 112 and the injected etchant gas to form grating structures on the surface of the substrate 170. The gas generator assembly 300 includes, among other components, the ionized gas generator 104, a gating structure 320, the voltage generator 126, the neutralizing ion generator 124, and the etchant gas injector 128. The functions and operations of the ionized gas generator 104, the voltage generator 126, the neutralizing ion generator 124, and the etchant gas injector 128 are described above with reference to FIG. 1 in detail, and are not repeated herein.

The gating structure 320 is similar to the gating structure 120 of FIG. 1 in that portions of the ionized gas 110 are passed selectively as directed gas 112 toward the substrate 170. However, the gating structure 320 includes a first plate 324 and a second plate 328 with apertures, as described below in detail with reference to FIGS. 3B and 3C. Unlike using grid patterns with active or non-active portions, the embodiment of FIG. 3A uses ionized gas 110 passing through the apertures of the first and second plates 324, 328 and exposing only a portion of the substrate 170 to the directed gas 112 (i.e., accelerated ionized gas 110) carrying the etchant gas 160. Then, either the gating structure 320 or the substrate 170 is moved to expose different parts of the substrate 170 to the directed gas 112 and the etchant gas 160. In this way, the desired pattern of grating 180 is formed on the substrate.

In one embodiment, the first plate 324 is coupled to the negative terminal of the voltage generator 126, and the second plate 328 is coupled to the positive terminal of the voltage generator 126. In this embodiment, there may be one or more screening grids at neutral potential.

The controller 330 controls operations of the gas generator assembly 300 and the actuator 380. The controller 330 includes a memory 340, a processor 350, an interface 360, and a bus 370. The memory 340 stores instructions for controlling the gas generator assembly 300 and the actuator 380. In some embodiments, the memory 340 may be embodied as external storage outside of the controller 330.

The processor 350 accesses the memory 340 via a bus 370 to retrieve the stored instructions. The bus 370 is a communication system that transfers data between components of the controller 330. The bus 370 is coupled to the memory 340, the processor 350, and the interface 360. The processor 350 executes the instructions and sends the processed commands to the interface 360 via the bus 370.

The interface 360 interfaces with the gas generator assembly 300 and the actuator 380. The interface 360 is coupled to the gas generator assembly 300 and the actuator 380. The interface 360 sends the commands to the gas generator assembly 300 and the actuator 380 to control operations of the gas generator assembly 300 and the movement of the substrate 170. For example, the voltage applied by the voltage generator 126 to the first plate 324 and the second plate 328 of the gating structure 320 is controlled in accordance with instructions from the controller 330. Additionally or optionally, the neutralizing ion generator 124 may be turned on or off in accordance with instructions from the controller 330. Other operations of the gas generator assembly 300 may be controlled by the controller 330.

The actuator 380 sequentially causes relative movements between the gating structure and the substrate to form different portions of the grating structure. The actuator 380 is coupled to the substrate 170 and moves the position of the substrate 170 in accordance with instructions from the controller 330. In the embodiment of FIG. 3A, the actuator 380 moves the substrate 170 in one dimension (e.g., z dimension). In some embodiments, the actuator 380 moves the substrate in two or more dimensions (e.g., x, y, z dimensions). By moving the substrate 170 in one or more dimensions, the grating 180 forms on different portions of the substrate 170. In other embodiments, the gas generator assembly 300 or some of its components (e.g., gating structure 320) may be moved relative to the substrate 170 to form a desired grating pattern on the substrate 170.

Figure 3B:
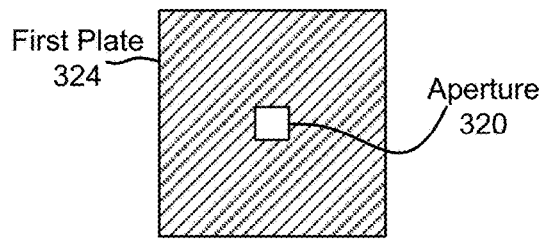
FIG. 3B illustrates a first plate of a gating structure, in accordance with an embodiment.

FIG. 3B illustrates a first plate of the gating structure, in accordance with an embodiment. The first plate 324 is applied with a positive voltage (e.g., beam voltage). The positive voltage is in the range of, e.g., 1 to 10000 volts. The first plate 324 includes a first aperture 320 through which the ionized gas 110 pass and accelerate towards a second plate. The first aperture 320 may be, e.g., few microns to few cm in diameter.

Figure 3C:
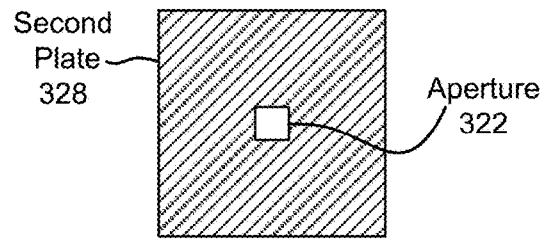
FIG. 3C illustrates a second plate of a gating structure, in accordance with an embodiment.

FIG. 3C illustrates a second plate of the gating structure, in accordance with an embodiment. The second plate 328 is applied with a negative voltage (e.g., acceleration voltage). The negative voltage is in the range of, e.g., 1 to 10000 volts. The second plate 328 includes a second aperture 322 aligned with the first aperture 320 through which the ionized gas 110 pass and accelerate towards the substrate 170. The second aperture 322 may be, e.g., few microns to few cm in diameter. In some embodiments, the second aperture 322 is substantially similar to the first aperture 320. The ionized gas 110 from the first aperture 320 of the first plate 324 passes through the second aperture 322 of the second plate 328, and is accelerated towards the substrate 170. The substrate 170 is moved in one or more dimensions by the actuator 380 in accordance with instructions from the controller 330, as described above with reference to FIG. 3A. As a result, a grating 180 is sequentially formed on a surface of the substrate 170.

Example Method for Fabrication a Diffraction Grating

Figure 4:
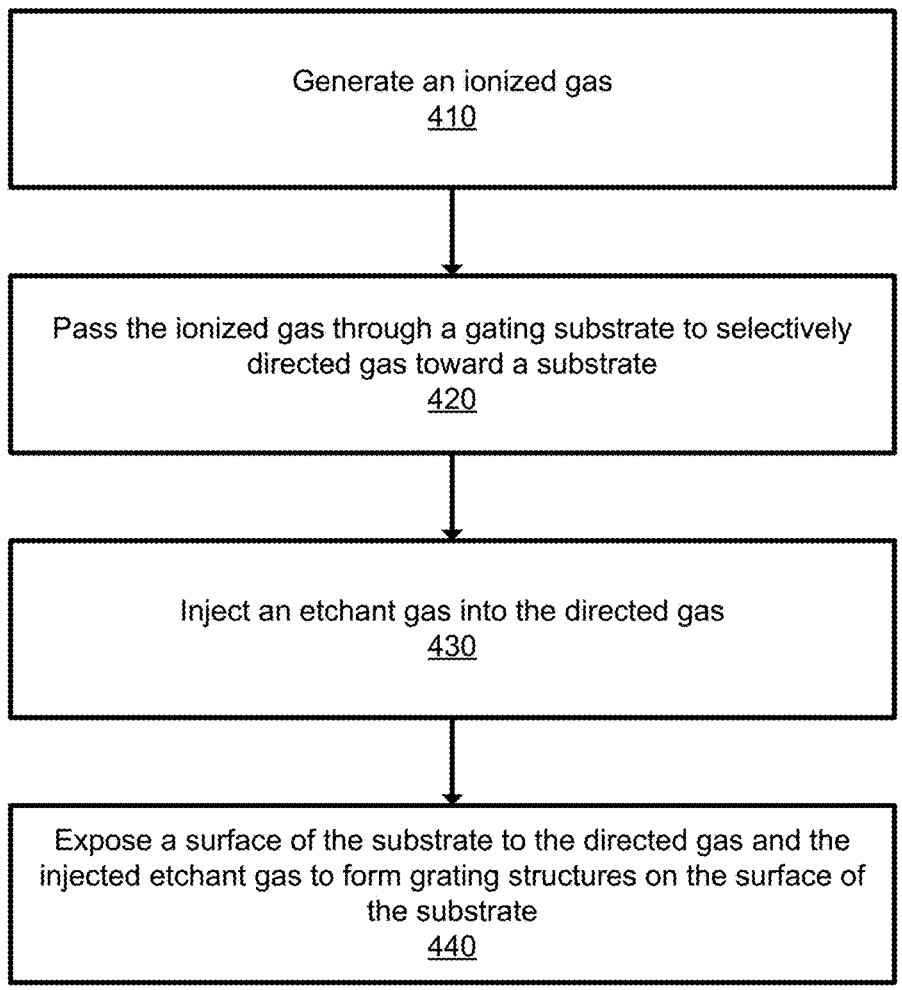
FIG. 4 illustrates a flowchart illustrating a process for fabricating a diffraction grating, in accordance with an embodiment.

FIG. 4 illustrates a flowchart of a process for fabricating a diffraction grating, in accordance with an embodiment. The process may include different or additional steps than those described in conjunction with FIG. 4 in some embodiments or perform steps in different orders than the order described in conjunction with FIG. 4.

An ionized gas is generated 410 by an ionized gas generator. In some embodiments, the ionized gas is ionized Argon gas. In some other embodiments, the ionized gas could be any fluorine or chlorine containing gases such as $CF_4$, $CHF_3$, $CH_2F_2$, $Ch_3F$, $C_4F_8$, $C_4F_6$, $C_2F_6$, $C_2F_8$, $NF_3$, $SF_6$, $ClF_3$, $Cl_2$, $BCl_3$, HBr, etc.

The process 400 also includes passing 420 the ionized gas through a gating structure to selectively directed gas toward a substrate. In some embodiments, the gating platform includes a first grid and a second grid through which the ionized gas pass sequentially. A voltage difference is applied across the first grid and the second grid to accelerate the ionized gas into the directed gas. In some other embodiments, the gating structure includes a first plate with a first aperture and a second plate with a second aperture aligned with the first aperture. A voltage difference is applied across the first plate and the second plate.

The process 400 also includes injecting 430 an etchant gas into the directed gas. The etchant gas is injected by an etchant gas injector. In some embodiments, the etchant gas is $Cl_2$, $CF_4$, $SF_6$, $NF_3$, $O_2$, $CH_3OH$, $C_2H_5OH$, etc.

The surface of the substrate is exposed 440 to the directed gas and the injected etchant gas to form grating structures on the surface of the substrate.

In some embodiments, the directed gas is neutralized using neutralizing gas ionized with polarity opposite to the directed gas. The neutralizing gas is generated by a neutralizing ion generator.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method for fabricating a diffraction grating, the method comprising:
   generating an ionized gas;
   passing the ionized gas through a gating structure to selectively direct the ionized gas toward a substrate;
   injecting an etchant gas into the directed gas, the etchant gas different from the directed gas; and
   exposing a surface of the substrate to the directed gas and the injected etchant gas to form grating structures on the surface of the substrate.

2. The method of claim 1, wherein the substrate is tilted at a predetermined angle relative to the path of the directed gas to form the grating structures on the substrate.

3. The method of claim 1, wherein the ionized gas is accelerated in the gating structure into the directed gas.

4. The method of claim 1, further comprising neutralizing the directed gas using neutralizing gas ionized with polarity opposite to the directed gas.

5. The method of claim 1, wherein the gating platform comprises a first grid and a second grid through which the ionized gas pass sequentially, a voltage difference applied across the first grid and the second grid to accelerate the ionized gas into the directed gas.

6. The method of claim 5, wherein the voltage difference is applied across portions of the first grid and portions of the second grid.

7. The method of claim 1, wherein the gating structure comprises a first plate with a first aperture and a second plate with a second aperture aligned with the first aperture, a voltage difference applied across the first plate and the second plate.

8. The method of claim 7, further comprising sequentially causing relative movements between the gating structure and the substrate to form different portions of the grating structure.

9. The method of claim 1, wherein the ionized gas is ionized Argon gas, and the etchant gas is at least one of $Cl_2$, $CF_4$, $SF_6$, $NF_3$, $O_2$, $CH_3OH$, and $C_2H_5OH$.

* * * * *